United States Patent
Korachara Mareppa

(10) Patent No.: US 12,543,100 B2
(45) Date of Patent: Feb. 3, 2026

(54) SYSTEMS AND METHODS FOR BLOCKING AND UN-BLOCKING X2ap NEIGHBORS BASED ON LOAD

(71) Applicant: RAKUTEN SYMPHONY, INC., Tokyo (JP)

(72) Inventor: Hanumantappa Korachara Mareppa, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 301 days.

(21) Appl. No.: 18/489,372

(22) Filed: Oct. 18, 2023

(65) Prior Publication Data
US 2025/0133472 A1    Apr. 24, 2025

(51) Int. Cl.
*H04W 36/36* (2009.01)
*H04W 36/00* (2009.01)

(52) U.S. Cl.
CPC ... *H04W 36/365* (2013.01); *H04W 36/00835* (2018.08)

(58) Field of Classification Search
CPC ....................... H04W 36/365; H04W 36/00835
See application file for complete search history.

(56) References Cited

U.S. PATENT DOCUMENTS

| | | | | |
|---|---|---|---|---|
| 7,477,920 B2 * | 1/2009 | Scheinert | ............. | H04W 24/02 455/426.2 |
| 9,008,659 B1 * | 4/2015 | Choi | ..................... | H04W 48/16 455/435.2 |
| 9,686,691 B2 * | 6/2017 | Salami | .................. | H04W 16/20 |
| 9,794,840 B1 * | 10/2017 | Tailor | .............. | H04W 36/00835 |
| 2015/0146655 A1 * | 5/2015 | Hui | ........................ | H04W 40/02 370/329 |
| 2015/0208298 A1 * | 7/2015 | Mclaughlin | ........... | H04W 24/02 455/436 |
| 2015/0208300 A1 * | 7/2015 | Mclaughlin | ..... | H04W 36/00835 455/436 |
| 2017/0034745 A1 * | 2/2017 | Dhanapal | .............. | H04W 36/34 |
| 2018/0091002 A1 * | 3/2018 | Park | ...................... | H02J 50/20 |
| 2020/0137646 A1 * | 4/2020 | Shi | ........................ | H04W 24/10 |

(Continued)

FOREIGN PATENT DOCUMENTS

| | | | | |
|---|---|---|---|---|
| EP | 3369264 B1 * | 5/2022 | ............ | H04W 72/29 |
| WO | WO-2025012957 A1 * | 1/2025 | ............ | H04W 24/02 |

*Primary Examiner* — Mehmood B. Khan
(74) *Attorney, Agent, or Firm* — Sughrue Mion, PLLC

(57) ABSTRACT

A method comprises receiving a message including neighbor connection information regarding a number of connections between a target base station and one or more neighboring base stations. The method includes determining whether a connection condition is satisfied. The method comprises, in response to determining the connection condition is satisfied, determining a number of handover requests performed between the target base station and each of the one or more neighboring base stations. The method comprises placing each base station from the one or more neighboring base stations having a number of handover requests below a handover threshold on a list associated with blocking the target base station. The method further comprises transmitting, to each base station included on the list, a control request to block the target base station from receiving a connection request or handover request from a respective base station included on the list.

20 Claims, 4 Drawing Sheets

(56) References Cited

U.S. PATENT DOCUMENTS

| | | | |
|---|---|---|---|
| 2022/0304066 A1* | 9/2022 | Tripathi | H04W 74/0833 |
| 2022/0369195 A1* | 11/2022 | Vivanco | H04W 36/326 |
| 2023/0232291 A1* | 7/2023 | Ramachandra | H04W 36/0079 |
| | | | 455/436 |
| 2023/0284108 A1* | 9/2023 | Abtin | H04W 48/04 |
| | | | 370/331 |
| 2024/0040448 A1* | 2/2024 | Ho | H04W 36/36 |
| 2024/0171539 A1* | 5/2024 | Qiu | H04L 61/50 |
| 2024/0291631 A1* | 8/2024 | Singh | H04W 12/069 |

* cited by examiner

SYSTEMS AND METHODS FOR BLOCKING AND UN-BLOCKING X2ap NEIGHBORS BASED ON LOAD

TECHNICAL FIELD

Apparatuses and methods consistent with example embodiments of the present disclosure relate to blocking and un-blocking X2ap neighbors based on a load.

BACKGROUND

A wireless communication network may include a plurality of eNodeBs, where one eNodeB (Source) wants to establish an X2ap connection with a neighbor eNodeB (Target). The target eNodeB may already have an established maximum number of allowed connections with neighboring base station (e.g., Max. 256). When the source eNodeB tries to send a stream control transmission protocol (SCTP) association (X2ap) with this target eNodeB, the target eNodeB accepts the connection regardless of the number of established connections, and then releases the connection immediately since the target eNodeB has associations with the maximum number of X2ap neighbors. Since the source eNodeB is not aware of the target eNodeB's overload condition (e.g., Target eNodeB reached full capacity), the source eNodeB keeps on trying to connect to the target eNodeB after every SCTP retry timer expiry (e.g., SCTP retry timer is 5 sec). Therefore, success/failure notifications will flood the northbound interface (EMS). Some solutions for reducing flooding of SCTP notifications include increasing the SCTP retry timer (e.g., doubling SCTP retry until a threshold such as 5 min). However, with this solution, the SCTP association will be tried after 5 min, but in between, the target eNB might be unloaded, which the source eNB may not be aware of.

Improvements are presented herein. These improvements may also be applicable to other multi-access technologies and the telecommunication standards that employ these technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for blocking and unblocking X2ap neighbors based on a load.

According to one or more embodiments, a network controller comprises at least one memory configured to store computer program code; and at least one processor configured to access said at least one memory and operate as instructed by the computer program code. The program code includes executing code configured to cause at least one of said at least one processor to execute a first application in communication with a second application executed by a target base station. The program code includes first receiving code configured to cause at least one of said at least one processor to receive, by the first application from the second application, a message including neighbor connection information regarding a number of connections between the target base station and one or more neighboring base stations. The program code includes first determining code configured to cause at least one of said at least one processor to determine, based on the neighbor connection information, whether a connection condition regarding the number of connections between the target base station and the one or more neighboring base stations is satisfied. The program code includes second determining code configured to cause at least one of said at least one processor to determine, in response to determining the connection condition is satisfied, determine a number of handover requests performed between the target base station and each of the one or more neighboring base stations. The program code includes listing code configured to cause at least one of said at least one processor to place each base station from the one or more neighboring base stations having a number of handover requests below a handover threshold on a list associated with blocking the target base station. The program code includes transmitting code configured to cause at least one of said at least one processor to transmit, to each base station included on the list, a control request to block the target base station from receiving a connection request or handover request from a respective base station included on the list.

According to one or more embodiments, a method is performed by at least one processor of a network controller operating in a wireless communication network. The method includes executing a first application in communication with a second application executed by a target base station. The method includes receiving, by the first application from the second application, a message including neighbor connection information regarding a number of connections between the target base station and one or more neighboring base stations. The method includes determining, based on the neighbor connection information, whether a connection condition regarding the number of connections between the target base station and the one or more neighboring base stations is satisfied. The method includes, in response to determining the connection condition is satisfied, determining a number of handover requests performed between the target base station and each of the one or more neighboring base stations. The method includes placing each base station from the one or more neighboring base stations having a number of handover requests below a handover threshold on a list associated with blocking the target base station. The method includes transmitting, to each base station included on the list, a control request to block the target base station from receiving a connection request or handover request from a respective base station included on the list.

According to one or more embodiments, a non-transitory computer readable medium having instructions stored therein, which when executed by a processor included in a network controller operating in a wireless communication network cause the processor to execute a method. The method includes executing a first application in communication with a second application executed by a target base station. The method includes receiving, by the first application from the second application, a message including neighbor connection information regarding a number of connections between the target base station and one or more neighboring base stations. The method includes determining, based on the neighbor connection information, whether a connection condition regarding the number of connections between the target base station and the one or more neighboring base stations is satisfied. The method includes, in response to determining the connection condition is satisfied, determining a number of handover requests performed between the target base station and each of the one or more neighboring base stations. The method includes placing each base station from the one or more neighboring base stations having a number of handover requests below a handover threshold on a list associated with blocking the target base station. The method includes transmitting, to each base station included on the list, a control request to block the target base station from receiving a connection request or handover request from a respective base station included on the list.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which.

DETAILED DESCRIPTION

Figure 1:
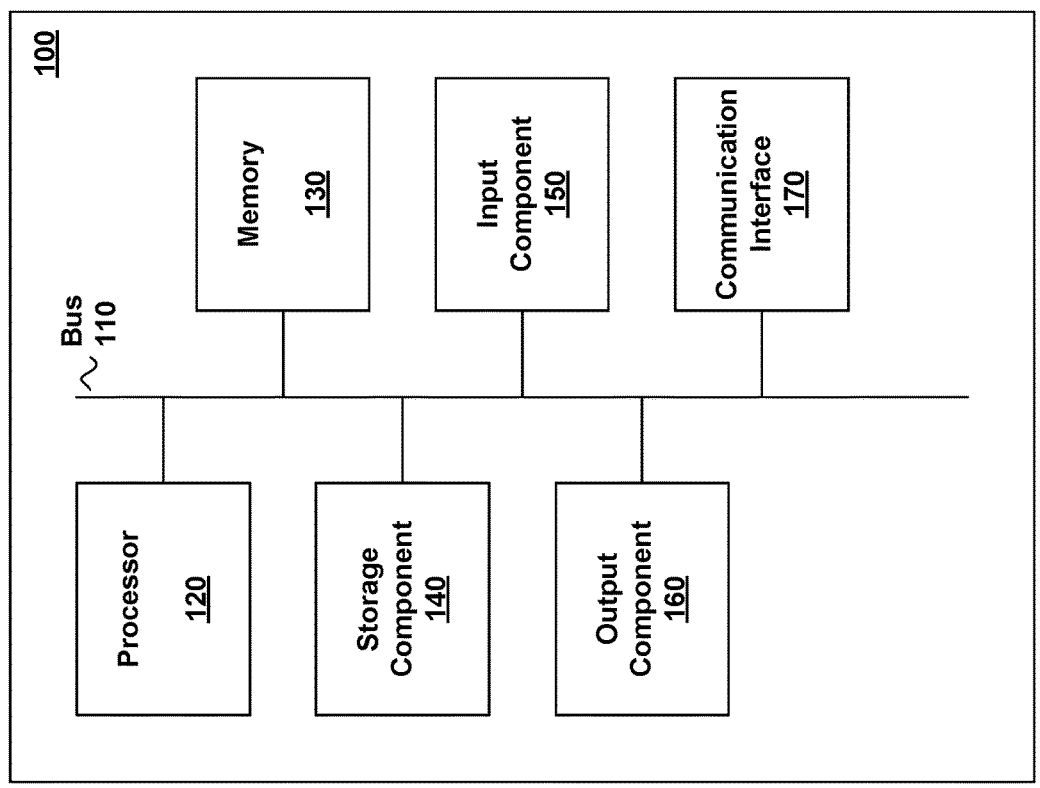
FIG. 1 is a diagram of an example network device in accordance with various embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Embodiments of the present disclosure are directed to blocking and unblocking X2ap neighbors based on a load of a target node. In one or more examples, a network controller such as a O-RAN RIC executes an application (e.g., Xapp) that maintains a number of neighbor link counts (e.g., X2ap connection between base stations). The network controller may also maintain and update an incoming and outgoing X2HO counter for each In one or more examples, the O-RAN RIC Xapp may detect if a first eNB (e.g., target eNB) is approaching a max X2ap neighbor threshold (e.g., number of neighbor connections is within 90% of maximum number of allowed connections). If it is determined that the first eNB is approaching the X2ap neighbor threshold, the O-RAN RIC-Xapp may calculate a number of incoming X2HO requests received from each eNB neighboring the first eNB. The O-RAN RIC-Xapp may further count the number of incoming X2HO requests based on a X2HO success rate weight factor. For a particular neighboring eNB having a number of X2HO requests that is below a threshold (e.g., handover threshold), the O-RAN RIC-Xapp may place this neighboring eNB on a list. The O-RAN RIC-Xapp may subsequently send a control request to each eNB included on the list indicating that the first eNB is blocked, thereby preventing the particular neighboring eNB from flooding the first eNB with SCTP notifications. The O-RAN RIC-Xapp may update the list to remove the particular neighboring eNB based on load criteria for the first eNB (e.g., number of neighboring connections is below 90% of maximum number of allowed connections), and may send a control request to the particular neighboring eNB indicating that the first eNB is unblocked.

The embodiments of the present disclosure provide the significantly advantageous features of reducing a load on north bound interface (EMS) by preventing flooding of SCTP notifications. The embodiments of the present disclosure further provide the opportunity for new eNBs to establish X2ap connections by blocking aging X2AP associated neighbors (e.g., X2ap association currently exists, but X2HO request between neighboring eNB and target eNB is below a threshold).

FIG. 1 is a diagram of an example device 100 for implementing the methods of the present disclosure. Device 100 may implement any of the rApps disclosed herein, as well as the O-RAN RIC, and the AI/ML framework. Device 100 may correspond to any type of known computer, server, or data processing device. For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, or any other similar functioning device.

In some embodiments, as shown in FIG. 1, the device 100 may include a set of components, such as a processor 120, a memory 130, a storage component 140, an input component 150, an output component 160, and a communication interface 170.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, and the communication interface 170).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may include one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may include an Ethernet interface, an optical interface, a coaxial interface, an infrared interface, a radio frequency (RF) interface, or the like.

The device 100 may be included in the core network 240 and perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

Figure 2:
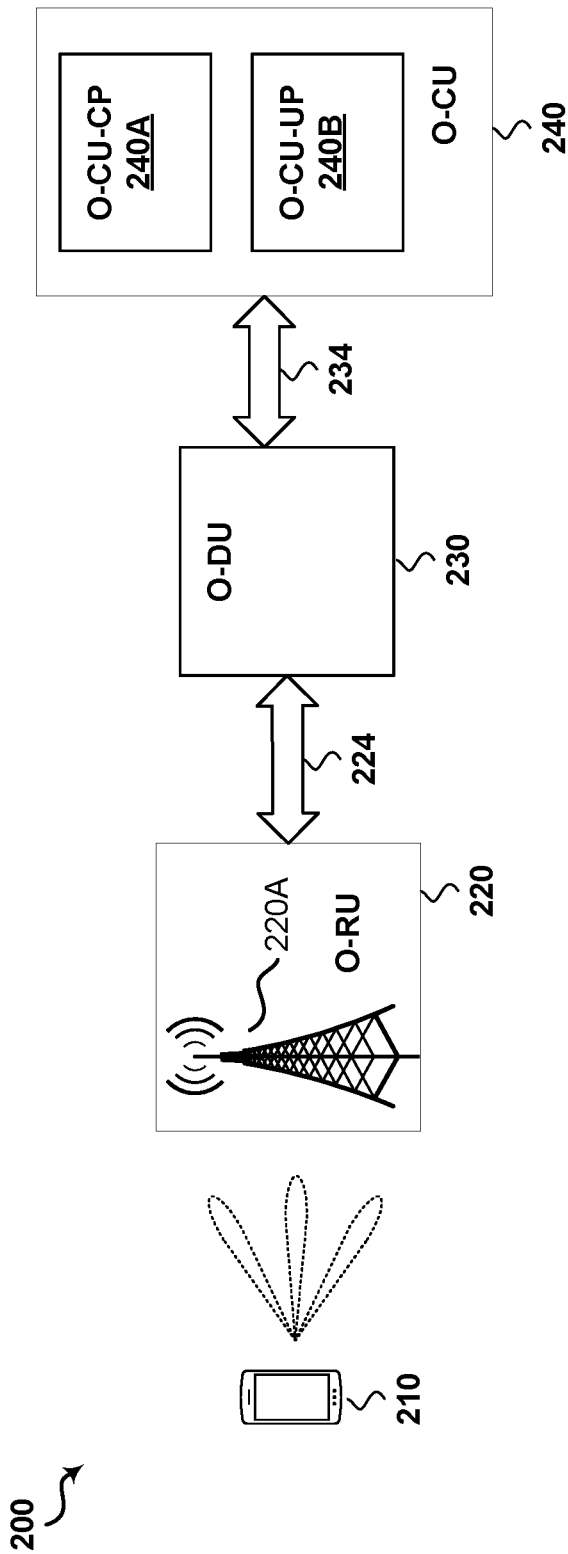
FIG. 2 is a schematic diagram of an example O-RAN communications system, in accordance with various embodiments of the present disclosure.

FIG. 2 is a diagram illustrating an example O-RAN communication system 200, according to various embodiments of the present disclosure. The O-RAN communication system 200 may include one or more user equipment (UE) 210, one or more O-RAN Radio Units (0-RU) 220 that includes one or more base stations 220*a*, one or more O-RAN Distribution Units (0-DU) 230, and one or more O-RAN Centralized Units (0-CU) 240.

Examples of UEs 210 may include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similarly functioning device. Some of the one or more UEs 210 may be referred to as Internet-of-Things (IoT) devices (e.g., parking meter, gas pump, toaster, vehicles, heart monitor, etc.). The one or more UEs 210 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile agent, a client, or some other suitable terminology.

The one or more base stations 220A of the O-RU 220 may wirelessly communicate with the one or more UEs 210. Each base station of the one or more base stations 220A may provide communication coverage to one or more UEs 210 located within a geographic coverage area of that base station 220A. In some embodiments, as shown in FIG. 2, the base station 220A may transmit one or more beamformed signals to the one or more UEs 210 in one or more transmit directions. The one or more UEs 210 may receive the beamformed signals from the base station 220A in one or more receive directions. Alternatively or additionally, the one or more UEs 210 may transmit beamformed signals to the base station 220 in one or more transmit directions. The base station 220A may receive the beamformed signals from the one or more UEs 210 in one or more receive directions.

The one or more base stations 220A may include macrocells (e.g., high power cellular base stations) and/or small cells (e.g., low power cellular base stations). The small cells may include femtocells, picocells, and microcells. A base station 220A, whether a macrocell or a large cell, may include and/or be referred to as an access point (AP), an evolved (or evolved universal terrestrial radio access network (E-UTRAN)) Node B (eNB), a next-generation Node B (gNB), or any other type of base station known to one of ordinary skill in the art.

In some embodiments, the O-RU 220 may be connected to the O-DU 230 via a FH link 224. The FH link 224 may be a 25 Gbps line in which User Plane (U-plane) and Control Plane (C-Plane) packets are downloaded from the O-DU 230 to the O-RU 220. In some embodiments, the O-DU 230 may be connected to the O-CU 240 via a midhaul link 234. The O-CU 240 may include an O-CU Control Plane (O-CU-CP) packet generator 240A and an O-CU User Plane (O-CU-UP) packet generator 240B. C-plane and U-plane packets may originate from the O-CU-CP packet generator 240A and the O-CU-UP packet generator 240B, respectively.

Figure 3:
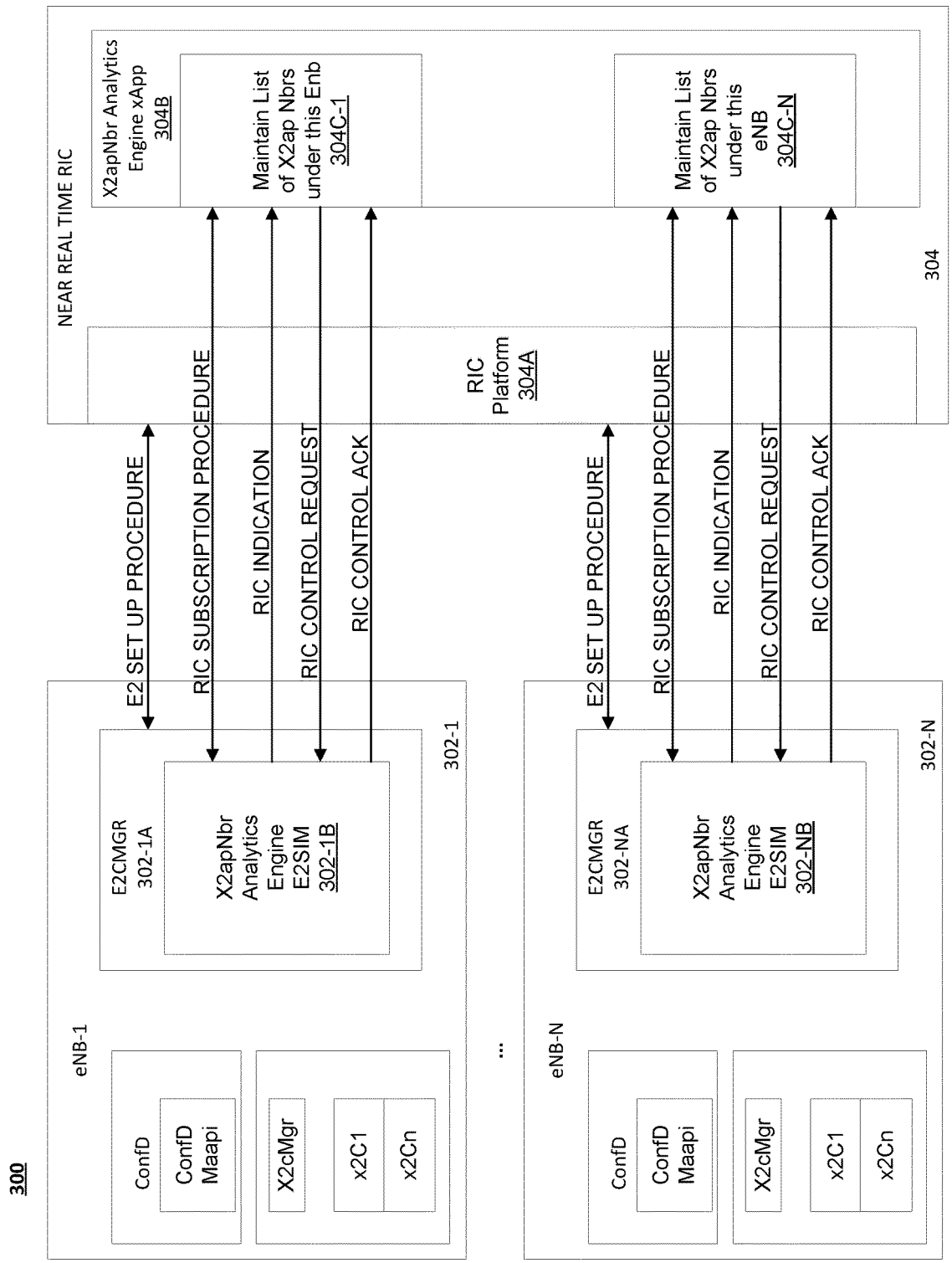
FIG. 3 illustrates an example network configuration between one or more base stations and a network controller.

FIG. 3 illustrates an example network configuration 300 with a plurality of eNBs (e.g., eNB-1 (302-1) to eNB-N (302-N)) and a Near Real Time RIC 304. Each eNB may include a E2CMGR and correspond X2ap analytics engine. For example, eNB-1 302-1 may include E2CMGR 302-1A with X2apNbr Analytics Engine E2SIM 302-1B. Furthermore, eNB-N may include E2CMGR 302-NA with X2apNbr Analytics Engine E2SIM 302-NB. The Near Real Time RIC 304 may further include a RIC Platform 304A and X2apNbr Analytics Engine xApp 304B. The xApp 304B may maintain a list of connections for each eNB. For example, the xApp 304B may include list 304C-1 that keeps track of each neighboring connection for enB-1 302-1, and list 304C-N that keeps track of each neighboring connection for eNB-N 302-N.

In one or more examples, in accordance with O-RAN procedures, an E2AP association (e.g., E2 set up procedure) may be performed between each E2CMGR and the RIC platform 304A. Furthermore, in accordance with O-RAN procedures, a RIC subscription procedure may be performed between each X2ap analytics engine and the xApp 304B.

In one or more examples, each E2CMGR will start an E2SM Indication periodic timer at an absolute system time boundary. When the timer expires, the E2CMGR may send X2ap neighbor counts and incoming and outgoing handover statistics to the xApp in an RIC indication message. The xApp 304B may maintain the received statics and check whether any eNBs are near to crossing a max X2ap neighbor threshold. For example, the xApp 304B may determine if, for a target eNB, whether a number of neighboring connections for the target eNB with other eNBs is within a predetermined percentage (e.g., 90%) of the max X2ap neighbor threshold. For example, if the max X2ap neighbor threshold for eNB-1 302-1 is 256, the xApp 304B may determine whether the number of connections for eNB-1 302-1 is 231 or greater.

If the xApp 304B detects that eNB1 302-1 is near to cross the max x2ap neighbor threshold, the xApp 304B may calculate the number of incoming X2HO requests received from other neighboring eNBs. The number of incoming X2HO requests may be based on a success rate weight factor. The success rate weight factor may correspond to a number of X2HO counters between the neighbor eNBs and the eNB which is near to cross an x2 link threshold limit (e.g., 256). If a neighboring eNB has a number of X2HO requests that is below a threshold, the xApp 304B may include the neighboring eNB on a list and send a RIC control request to each eNB included on the list indicating that eNB1 302-1 is blocked from receiving SCTP notifications.

The eNB E2CMGR may receive the RIC control request from the xApp 304, and subsequently update internal modules to block the eNB-1 302-1. In one or more examples, the eNB E2CMGR may send a RIC control acknowledgement to the O-RAN RIC indicating that the E2CMGR received the RIC control request and updated internal modules to block eNB-1 302-1. Therefore, as a result, since the target eNB (e.g., eNB1-1) is blocked, the source eNB will not try for SCTP association with the blocked eNB, thereby avoiding SCTP notification flooding.

The process of the xApp 304B receiving the RIC indication and sending the RIC control request may continue until the xApp 304B detects the eNB-1 302-1 is less loaded for 2-3 iterations. If the load criteria is met, the xApp 304B may update the list removing the eNBs blocked from sending SCTP notifications to eNB-1 302-1, and send RIC control requests to the eNBs previously included on the list to unblock the eNB-1 302-1. For example, when the xApp 304B receives a predetermined number of RIC indications (e.g., 2 or 3) indicating that a blocked eNB has a number of connections that is a predetermined number below the max X2ap threshold, the xApp 304B may remove each eNB included on the list for the blocked eNB-1 302-1, and send a RIC control request to each eNB removed from the list indicating that the eNB may resume sending SCTP notifications to the target eNB-1 302-1.

In one or more examples, when E2CMGR of the previously blocked eNB receives the RIC control request indicating that the eNB is no longer blocked, the E2CMGR may update internal modules to unblock the eNB. The eNB E2CMGR may send the RIC control acknowledgement to the xApp 304B.

Figure 4:
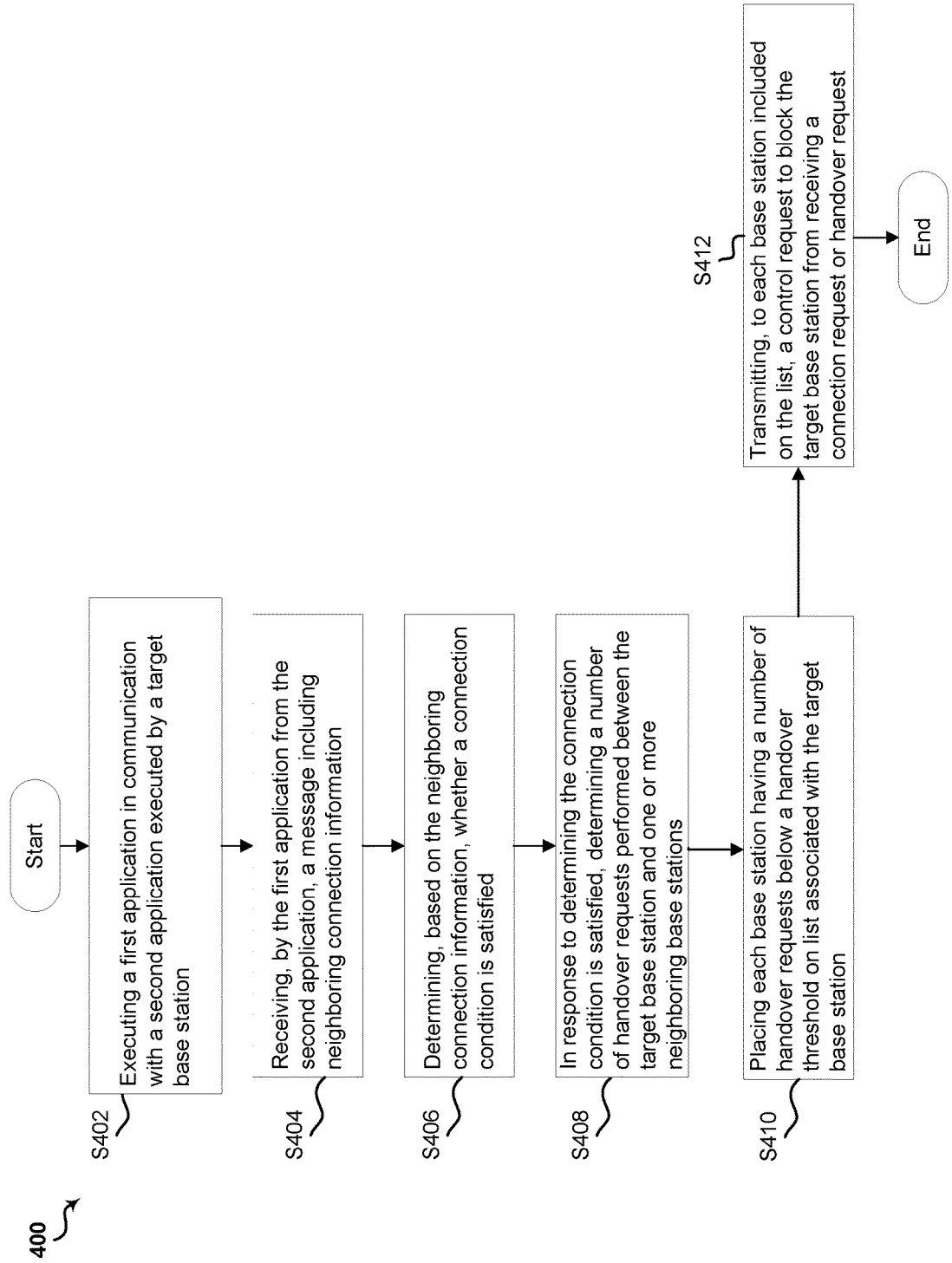
FIG. 4 illustrates a flowchart of an embodiment of a process blocking X2AP neighbors.

FIG. 4 illustrates an embodiment of a process 400 for blocking a target base station. The process illustrated in FIG. 4 may be performed by a network controller such as the near real time RIC 304. The process may start at operation S402 where the network controller executes a first application in communication with a second application executed by a target base station. For example, the target base station may be base station eNB-1 302-1, the first application may be xApp 304B, and the second application may be X2apNbr Analytics Engine E2SIM 302-1B run by the E2CMGR 302-1A of eNB-1. The xApp 304B and the X2apNbr Analytics Engine E2SIM 302-1B may execute a subscription procedure (e.g., RIC subscription procedure) between each other.

The process proceeds to operation S404 where the network controller receives, by the first application from the second application, a message including neighboring connection formation. For example, the xApp 304B may receive, from the X2apNbr Analytics Engine E2SIM 302-1B, a RIC indication including statistics regarding the current number of X2ap neighboring connections enB-1 302-1 has with each other neighboring base station. The RIC indication may further include the number of handover requests received from each neighboring base station.

The process proceeds to operation S406 where the network controller determines, based on the neighboring connection information, whether a connection condition is satisfied. For example, the connection condition may be satisfied if the number of neighboring connections is 90% or greater of a maximum number of allowed connections with the target base station. For example, if the number of allowed connections with the target base station is 256, the connection condition may be satisfied if the number of neighboring connections with the target base station is 231 or greater.

The process proceeds to operation S408 where in response to determining the connection condition is satisfied, the network controller determines a number of handover requests performed between the target base station each of the one or more neighboring base stations. For example, operation S408 is performed when the target base station is near to crossing the maximum number of allowed connections (e.g., connection condition is satisfied).

The process proceeds to operation S410 where the network controller places each base station having a number of handover requests below a handover threshold on a list associated with the target base station. For example, each base station included on the list may be blocked from sending SCTP notifications to the target base station.

The process proceeds to operation S412 where the network controller transmits, to each base station included on the list, a control request to block the target base station from receiving a connection request or a handover request. For example, the control request may be a RIC control request, where each base station that receives this request updates internal modules such that the base station does not send a SCTP notification to the target base station.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A network controller comprising: at least one memory configured to store computer program code; and at least one processor configured to access said at least one memory and operate as instructed by the computer program code, the computer program code including: executing code configured to cause at least one of said at least one processor to execute a first application in communication with a second application executed by a target base station; first receiving code configured to cause at least one of said at least one processor to receive, by the first application from the second application, a message including neighbor connection information regarding a number of connections between the target base station and one or more neighboring base stations; first determining code configured to cause at least one of said at least one processor to determine, based on the neighbor connection information, whether a connection condition regarding the number of connections between the target base station and the one or more neighboring base stations is satisfied; second determining code configured to cause at least one of said at least one processor to determine, in response to determining the connection condition is satisfied, determine a number of handover requests performed between the target base station and each of the one or more neighboring base stations; listing code configured to cause at least one of said at least one processor to place each base station from the one or more neighboring base stations having a number of handover requests below a handover threshold on a list associated with blocking the target base station; and transmitting code configured to cause at least one of said at least one processor to transmit, to each base station included on the list, a control request to block the target base station from receiving a connection request or handover request from a respective base station included on the list.

(2) The network controller according to feature (1), in which the program code further includes second receiving code configured to cause at least one of said at least one processor to receive, from each base station included on the list, an acknowledgement indicating that the respective base station included on the list blocked the target base station from receiving the connection request or the handover request.

(3) The network controller according to feature (1) or (2), in which the program code further includes: third receiving code configured to cause at least one of said at least one processor to receive, after determining that the connection condition is satisfied, another message including updated neighbor connection information regarding the number of connections between the target base station and the one or more neighboring base stations; third determining code configured to cause at least one of said at least one processor to determine, based on the updated neighbor connection information, whether the connection condition is satisfied; removing code configured to cause at least one of said at least one processor to remove, in response to determining that connection condition is not satisfied, each base station included on the list; and second transmitting code configured to cause at least one of said at least one processor to transmit, to each base station removed from the list, a control request indicating the target base station is no longer blocked.

(4) The network controller according to any one of features (1)-(3), in which the connection condition specifies that the number of connections between the target base stations and the one or more neighboring base stations is within a predetermined number of a maximum number of allowable connections.

(5) The network controller according to any one of features (1)-(4), in which the first application conducts a subscription procedure with the second application.

(6) The network controller according to any one of features (1)-(5), in which the network controller is an open radio access network (O-RAN) intelligent controller (RIC).

(7) The network controller of feature (6), in which the control request transmitted to each base station included on the list is a RIC control request.

(8) The network controller of feature (6) or (7), in which the first application is an Xapp and each connection between the one or more neighboring base stations and the target base station is an X2AP connection.

(9) A method performed by at least one processor of a network controller operating in a wireless communication network, the method comprising: executing a first application in communication with a second application executed by a target base station; receiving, by the first application from the second application, a message including neighbor connection information regarding a number of connections between the target base station and one or more neighboring base stations; determining, based on the neighbor connection information, whether a connection condition regarding the number of connections between the target base station and the one or more neighboring base stations is satisfied; in response to determining the connection condition is satisfied, determining a number of handover requests performed between the target base station and each of the one or more neighboring base stations; placing each base station from the one or more neighboring base stations having a number of handover requests below a handover threshold on a list associated with blocking the target base station; and transmitting, to each base station included on the list, a control request to block the target base station from receiving a connection request or handover request from a respective base station included on the list.

(10) The method of feature (9), further comprising: receiving, from each base station included on the list, an acknowledgement indicating that the respective base station included on the list blocked the target base station from receiving the connection request or the handover request.

(11) The method of feature (9) or (10), further comprising: after determining that the connection condition is satisfied, receiving another message including updated neighbor connection information regarding the number of connections between the target base station and the one or more neighboring base stations; determining, based on the updated neighbor connection information, whether the connection condition is satisfied; in response to determining that connection condition is not satisfied, removing each base station included on the list; and transmitting to each base station removed from the list a control request indicating the target base station is no longer blocked.

(12) The method according to any one of features (9)-(11), in which the connection condition specifies that the number of connections between the target base stations and the one or more neighboring base stations is within a predetermined number of a maximum number of allowable connections.

(13) The method according to any one of features (9)-(12), in which the first application conducts a subscription procedure with the second application.

(14) The method according to any one of features (9)-(13), in which the network controller is an open radio access network (O-RAN) intelligent controller (RIC).

(15) The method according to any one of feature (14), in which the control request transmitted to each base station included on the list is a RIC control request.

(16) The method according to any one of feature (14) or (15), in which the first application is an Xapp and each connection between the one or more neighboring base stations and the target base station is an X2AP connection.

(17) A non-transitory computer readable medium having instructions stored therein, which when executed by a processor included in a network controller operating in a wireless communication network cause the processor to execute a method comprising: executing a first application in communication with a second application executed by a target base station; receiving, by the first application from the second application, a message including neighbor connection information regarding a number of connections between the target base station and one or more neighboring base stations; determining, based on the neighbor connection information, whether a connection condition regarding the number of connections between the target base station and the one or more neighboring base stations is satisfied; in response to determining the connection condition is satisfied, determining a number of handover requests performed between the target base station and each of the one or more neighboring base stations; placing each base station from the one or more neighboring base stations having a number of handover requests below a handover threshold on a list associated with blocking the target base station; and transmitting, to each base station included on the list, a control request to block the target base station from receiving a connection request or handover request from a respective base station included on the list.

(18) The non-transitory computer readable medium according to feature (17), wherein the method further comprises: receiving, from each base station included on the list, an acknowledgement indicating that the respective base station included on the list blocked the target base station from receiving the connection request or the handover request.

(19) The non-transitory computer readable medium according to feature (17) or (18), in which the method further comprises: after determining that the connection condition is satisfied, receiving another message including updated neighbor connection information regarding the number of connections between the target base station and the one or more neighboring base stations; determining, based on the updated neighbor connection information, whether the connection condition is satisfied; in response to determining that connection condition is not satisfied, removing each base station included on the list; and transmitting to each base station removed from the list a control request indicating the target base station is no longer blocked.

(20) The non-transitory computer readable medium according to any one of features (17)-(19), in which the connection condition specifies that the number of connections between the target base stations and the one or more neighboring base stations is within a predetermined number of a maximum number of allowable connections.

APPENDIX

```
-- ASN1START
-- ***************************************************
-- E2SM-X2APLINK
-- Information Element Definitions
--
-- ***************************************************
E2SM-X2APLINK-IEs {
iso(1) identified-organization(3) dod(6) internet(1) private(4) enterprise(1) 13777 e2(1)
version1 (1) e2sm(2) e2sm-X2APLINK-IEs (1)}
DEFINITIONS AUTOMATIC TAGS ::=
BEGIN
IMPORTS
   Cause,
   CriticalityDiagnostics,
   GlobalE2node-ID,
   GlobalRIC-ID,
   RANfunctionDefinition,
   RANfunctionID,
   RANfunctionRevision,
   RICcontrolAckRequest,
   RICcontrolHeader,
   RICcontrolMessage,
   RICcontrolOutcome,
   RICcontrolStatus,
   RICeventTriggerDefinition,
   RICindicationHeader,
   RICindicationMessage,
   RICindicationSN,
   RICindicationType,
   RICrequestID,
   RICactionDefinition,
   TimeTo Wait
FROM E2AP-IEs;
-- ***************************************************
-- IEs
-- ***************************************************
maxofRICstyles      INTEGER ::= 63
maxCellingeNB     INTEGER ::=256
-- ---------------------------------------------------
-- RAN Function Description OCTET STRING contents
```

-continued

APPENDIX

```
-- --------------------------------------------------
RIC-Format-Type ::= INTEGER
RIC-Style-Type ::= INTEGER
RIC-Style-Name ::= PrintableString(SIZE(1..150,...))
RANfunction-Name ::= SEQUENCE{
    ranFunction-ShortName    PrintableString(SIZE(1..150,...)),
    ranFunction-E2SM-OID     PrintableString(SIZE(1..1000,...)),
    ranFunction-Description  PrintableString(SIZE(1..150,...)),
    ranFunction-Instance     INTEGER                    OPTIONAL,
    ...
}
-- E2SM-X2APLINK-RANfunction-Definition
E2SM-X2APLINK-RANfunction-Definition ::= SEQUENCE{
    ranFunction-Name   RANfunction-Name ,
    ranSubfunction-List    E2SM-X2APINK-RAN-Subfunction
}
E2SM-X2APINK-RAN-Subfunction ::= SEQUENCE{
    e2SM-X2APLINK-RAN-Subfunction1   E2SM-X2APLINK-RAN-Subfunction-format1,
    ...
}
E2SM-X2APLINK-RAN-Subfunction-format1 ::= SEQUENCE{           -- for xAPP1
    ric-EventTriggerStyle-List SEQUENCE (SIZE(1..maxofRICstyles)) OF RIC-EventTriggerStyle ,
    ric-ReportStyle-List     SEQUENCE (SIZE(1..maxofRICstyles)) OF RIC-ReportStyle ,
    ric-ControlStyle-List    SEQUENCE (SIZE(1..maxofRICstyles)) OF RIC-ControlStyle ,
    ...
}
-- --------------------------------------------------
-- commmon IEs
-- --------------------------------------------------
RIC-EventTriggerStyle ::= SEQUENCE{
    ric-EventTriggerStyle-Type     ENUMERATED { insert ,report, policy,...}, -- report
    ric-EventTriggerStyle-Name     RIC-Style-Name,     -- Event-Based
    ric-EventTriggerFormat-Type    RIC-Format-Type,
    ...
}
RIC-ReportStyle ::= SEQUENCE{
    ric-ReportStyle-Type         RIC-Style-Type,
    ric-ReportStyle-Name         RIC-Style-Name,
    ric-IndicationHeaderFormat-Type    E2SM-X2APLINK-IndicationHeader,
    ric-IndicationMessageFormat-Type   E2SM-X2APLINK-IndicationMessage,
    ...
}
RIC-ControlStyle ::= SEQUENCE{
    ric-ControlStyle-Type        RIC-Style-Type,
    ric-ControlStyle-Name        RIC-Style-Name,
    ric-ControlFormat-Type       RIC-Format-Type,
    ric-ControlHeaderFormat-Type     E2SM-X2APLINK-ControlHeader ,
    ric-ControlMessageFormat-Type    E2SM-X2APLINK-ControlMessage,
    ...
}
-- --------------------------------------------------
-- Indication Header OCTET STRING contents
-- --------------------------------------------------
-- E2SM-X2APLINK-IndicationHeader IE
E2SM-X2APLINK-IndicationHeaderDefs ::= CHOICE{
    id-indicationHeader-Format1    E2SM-X2APLINK-IndicationHeader-Format1 ,
    ...
}
-- E2SM-X2APLINK-IndicationHeader Format 1
    E2SM-X2APLINK-IndicationHeader-Format1 ::= SEQUENCE{      -- Need to be defined
for X2APLINK use case
    id-GlobalE2node-ID    GlobalE2node-ID ,
        ...
}
-- --------------------------------------------------
-- Indication Message OCTET STRING contents
-- --------------------------------------------------
-- E2SM-X2APLINK-IndicationMessage IE
E2SM-X2APLINK-IndicationMessageDefs ::= CHOICE{
    id-indicationMessage-Format1    E2SM-X2APLINK-IndicationMessage-Format1,
    ...
}
-- E2SM-X2APLINK-IndicationMessage IE
E2SM-X2APLINK-IndicationMessage-Format1 ::= SEQUENCE{          -- Used for
Report Service
x2aplink-Containers SEQUENCE (SIZE(1..maxCellingeNB)) OF X2APLink-Containers-
```

APPENDIX

```
List, -- measurement statistical data for gNB cells
...
}
X2APLink-Containers-List ::= SEQUENCE{
id-GlobalE2node-ID     GlobalE2node-ID ,
total-ho-in       INTEGER (0..65536) ,
total-ho-out      INTEGER (0..65536) ,
  ...
}
-- E2SM-X2APLINK-ControlMessage IE
E2SM-X2APLINK-ControlMessageDefs ::= CHOICE{
   id-controlMessage-Format1     E2SM-X2APLINK-ControlMessage-Format1,
   ...
}
E2SM-X2APLINK-ControlMessage-Format1 ::= SEQUENCE{
   enbid-tobe-update   Black-Unblack-eNB-Id,
   rank-container-list SEQUENCE (SIZE(1..maxCellingeNB)) OF Rank-Container-List,
   ...
}
Rank-Container-List ::= SEQUENCE{
id-GlobalE2node-ID     GlobalE2node-ID ,
...
}
Black-Unblack-eNB-Id ::= CHOICE{
   enbid-to-be-black      GlobalE2node-ID,
   enbid-to-be-unblack    GlobalE2node-ID,
   ...
}
-- ---------------------------------------------------
-- Control Header OCTET STRING contents
-- ---------------------------------------------------
-- E2SM-X2APLINK-ControlHeader IE
E2SM-X2APLINK-ControlHeaderDefs ::= CHOICE{
   id-controlHeader-Format1     E2SM-X2APLINK-ControlHeader-Format1,
   ...
}
-- E2SM-X2APLINK-ControlHeader Format 1
E2SM-X2APLINK-ControlHeader-Format1 ::= SEQUENCE{
   id-GlobalE2node-ID    GlobalE2node-ID ,
   ...
}
-- ---------------------------------------------------
-- Event Trigger Definition OCTET STRING contents
-- ---------------------------------------------------
-- E2SM-X2APLINK-EventTriggerDefinition IE
E2SM-X2APLINK-EventTriggerDefinition ::= CHOICE{
    eventDefinition-Format1    E2SM-X2APLINK-EventTriggerDefinition-Format1,
       ...
}
-- E2SM-X2APLINK-EventTriggerDefinition IE is used for Event Trigger Definition Format1
E2SM-X2APLINK-EventTriggerDefinition-Format1 ::= SEQUENCE{
    triggercondition   Trigger-ConditionIE-Item1,
              ...
}
Trigger-ConditionIE-Item1 ::= SEQUENCE{
    event-driven   BOOLEAN,
           ...
}
---------------------------------------------------
E2SM-X2APLINK-IndicationMessage ::= ENUMERATED{ id-indicationMessage-
Format1 , ...}
E2SM-X2APLINK-IndicationHeader ::= ENUMERATED { id-indicationHeader-
Format1, ... }
E2SM-X2APLINK-ControlHeader ::= ENUMERATED{id-controlHeader-Format1, ... }
E2SM-X2APLINK-ControlMessage ::= ENUMERATED{id-controlMessage-Format1, ... }
END
-- ASNISTOP
```

What is claimed is:

1. A network controller comprising:

at least one memory configured to store computer program code; and at least one processor configured to access said at least one memory and operate as instructed by the computer program code, the computer program code including:

executing code configured to cause at least one of said at least one processor to execute a first application in communication with a second application executed by a target base station;

first receiving code configured to cause at least one of said at least one processor to receive, by the first application from the second application, a message including neighbor connection information regarding a number of connections between the target base station and one or more neighboring base stations;

first determining code configured to cause at least one of said at least one processor to determine, based on the neighbor connection information, whether a connection condition regarding the number of connections between the target base station and the one or more neighboring base stations is satisfied;

second determining code configured to cause at least one of said at least one processor to determine, in response to determining the connection condition is satisfied, determine a number of handover requests performed between the target base station and each of the one or more neighboring base stations;

listing code configured to cause at least one of said at least one processor to place each base station from the one or more neighboring base stations having a number of handover requests below a handover threshold on a list associated with blocking the target base station; and transmitting code configured to cause at least one of said at least one processor to transmit, to each base station included on the list, a control request to block the target base station from receiving a connection request or handover request from a respective base station included on the list.

2. The network controller according to claim 1, wherein the program code further includes second receiving code configured to cause at least one of said at least one processor to receive, from each base station included on the list, an acknowledgement indicating that the respective base station included on the list blocked the target base station from receiving the connection request or the handover request.

3. The network controller according to claim 1, wherein the program code further includes:

third receiving code configured to cause at least one of said at least one processor to receive, after determining that the connection condition is satisfied, another message including updated neighbor connection information regarding the number of connections between the target base station and the one or more neighboring base stations;

third determining code configured to cause at least one of said at least one processor to determine, based on the updated neighbor connection information, whether the connection condition is satisfied;

removing code configured to cause at least one of said at least one processor to remove, in response to determining that connection condition is not satisfied, each base station included on the list; and second transmitting code configured to cause at least one of said at least one processor to transmit, to each base station removed from the list, a control request indicating the target base station is no longer blocked.

4. The network controller according to claim 1, wherein the connection condition specifies that the number of connections between the target base stations and the one or more neighboring base stations is within a predetermined number of a maximum number of allowable connections.

5. The network controller according to claim 1, wherein the first application conducts a subscription procedure with the second application.

6. The network controller according to claim 1, wherein the network controller is an open radio access network (O-RAN) intelligent controller (RIC).

7. The network controller of claim 6, wherein the control request transmitted to each base station included on the list is a RIC control request.

8. The network controller of claim 6, wherein the first application is an Xapp and each connection between the one or more neighboring base stations and the target base station is an X2AP connection.

9. A method performed by at least one processor of a network controller operating in a wireless communication network, the method comprising:

executing a first application in communication with a second application executed by a target base station;

receiving, by the first application from the second application, a message including neighbor connection information regarding a number of connections between the target base station and one or more neighboring base stations;

determining, based on the neighbor connection information, whether a connection condition regarding the number of connections between the target base station and the one or more neighboring base stations is satisfied;

in response to determining the connection condition is satisfied, determining a number of handover requests performed between the target base station and each of the one or more neighboring base stations;

placing each base station from the one or more neighboring base stations having a number of handover requests below a handover threshold on a list associated with blocking the target base station; and transmitting, to each base station included on the list, a control request to block the target base station from receiving a connection request or handover request from a respective base station included on the list.

10. The method of claim 9, further comprising:

receiving, from each base station included on the list, an acknowledgement indicating that the respective base station included on the list blocked the target base station from receiving the connection request or the handover request.

11. The method of claim 9, further comprising:

after determining that the connection condition is satisfied, receiving another message including updated neighbor connection information regarding the number of connections between the target base station and the one or more neighboring base stations;

determining, based on the updated neighbor connection information, whether the connection condition is satisfied;

in response to determining that connection condition is not satisfied, removing each base station included on the list; and transmitting to each base station removed from the list a control request indicating the target base station is no longer blocked.

12. The method according to claim 9, wherein the connection condition specifies that the number of connections between the target base stations and the one or more neighboring base stations is within a predetermined number of a maximum number of allowable connections.

13. The method of claim 9, wherein the first application conducts a subscription procedure with the second application.

14. The method of claim 9, wherein the network controller is an open radio access network (O-RAN) intelligent controller (RIC).

15. The method of claim 14, wherein the control request transmitted to each base station included on the list is a RIC control request.

16. The method of claim 14, wherein the first application is an Xapp and each connection between the one or more neighboring base stations and the target base station is an X2AP connection.

17. A non-transitory computer readable medium having instructions stored therein, which when executed by a processor included in a network controller operating in a wireless communication network cause the processor to execute a method comprising:
   executing a first application in communication with a second application executed by a target base station;
   receiving, by the first application from the second application, a message including neighbor connection information regarding a number of connections between the target base station and one or more neighboring base stations;
   determining, based on the neighbor connection information, whether a connection condition regarding the number of connections between the target base station and the one or more neighboring base stations is satisfied;
   in response to determining the connection condition is satisfied, determining a number of handover requests performed between the target base station and each of the one or more neighboring base stations;
   placing each base station from the one or more neighboring base stations having a number of handover requests below a handover threshold on a list associated with blocking the target base station; and
   transmitting, to each base station included on the list, a control request to block the target base station from receiving a connection request or handover request from a respective base station included on the list.

18. The non-transitory computer readable medium according to claim 17, wherein the method further comprises:
   receiving, from each base station included on the list, an acknowledgement indicating that the respective base station included on the list blocked the target base station from receiving the connection request or the handover request.

19. The non-transitory computer readable medium according to claim 17, wherein the method further comprises:
   after determining that the connection condition is satisfied, receiving another message including updated neighbor connection information regarding the number of connections between the target base station and the one or more neighboring base stations;
   determining, based on the updated neighbor connection information, whether the connection condition is satisfied;
   in response to determining that connection condition is not satisfied, removing each base station included on the list; and
   transmitting to each base station removed from the list a control request indicating the target base station is no longer blocked.

20. The non-transitory computer readable medium according to claim 17, wherein the connection condition specifies that the number of connections between the target base stations and the one or more neighboring base stations is within a predetermined number of a maximum number of allowable connections.

\* \* \* \* \*